(12) United States Patent
Miyake (10) Patent No.: US 7,077,016 B2
(45) Date of Patent: Jul. 18, 2006

(54) LOAD SENSOR

(75) Inventor: Toshikatsu Miyake, Miyagi-ken (JP)

(73) Assignee: ALPS Electric Co., Ltd., Tokyo (JP)

( * ) Notice: Subject to any disclaimer, the term of this patent is extended or adjusted under 35 U.S.C. 154(b) by 0 days.

(21) Appl. No.: 10/929,122

(22) Filed: Aug. 26, 2004

(65) Prior Publication Data

US 2005/0050958 A1    Mar. 10, 2005

(30) Foreign Application Priority Data

Sep. 5, 2003  (JP) .............................. 2003-313908
Jul. 20, 2004  (JP) .............................. 2004-211707

(51) Int. Cl.
*G01L 1/04* (2006.01)

(52) U.S. Cl. ................................. 73/862.627
(58) Field of Classification Search ........... 73/862.627, 73/862.451, 862.381, 862.474
See application file for complete search history.

(56) References Cited

U.S. PATENT DOCUMENTS

| | | | |
|---|---|---|---|
| 3,853,000 A | * | 12/1974 | Barnett et al. ................. 73/763 |
| 4,064,744 A | * | 12/1977 | Kistler ......................... 73/766 |
| 4,376,929 A | * | 3/1983 | Myhre ........................... 338/4 |
| 4,429,579 A | * | 2/1984 | Wilhelm ........................ 73/768 |
| 4,657,097 A | * | 4/1987 | Griffen ........................ 177/211 |
| 2004/0035224 A1 | * | 2/2004 | Kajiyama et al. ........ 73/862.474 |
| 2004/0124018 A1 | * | 7/2004 | Yanagi ........................ 177/144 |

FOREIGN PATENT DOCUMENTS

| | | |
|---|---|---|
| JP | 2000-292283 | 10/2000 |
| JP | 2001-330522 | 11/2001 |

* cited by examiner

*Primary Examiner*—Max Noori
(74) *Attorney, Agent, or Firm*—Beyer, Weaver & Thomas LLP.

(57) ABSTRACT

A load sensor includes a resilient member including a stationary segment, a load-receiving segment extending outward from the stationary segment, and an arm segment between the load-receiving segment and the stationary segment. Moreover, first and second strain-sensor elements are disposed on the same surface of the arm segment. The first strain-sensor element is adjacent to the load-receiving segment and the second strain-sensor element is adjacent to the stationary segment. The arm segment is tapered such that the cross-sectional area of the arm segment decreases from the stationary segment to the load-receiving segment. The narrowest portion of the arm segment has the first strain-sensor element disposed thereon. Accordingly, when a load generated by an impact is applied to the load-receiving segment, the maximum stress is reduced, and moreover, a difference between a stress applied to the first strain-sensor element and a stress applied to the second strain-sensor element is minimized.

4 Claims, 7 Drawing Sheets

LOAD SENSOR

BACKGROUND OF THE INVENTION

1. Field of the Invention

The present invention relates to load sensors used for vehicle seats, and particularly, to a load sensor that converts straining of strain-sensor elements to weight values.

2. Description of the Related Art

Figure 8:
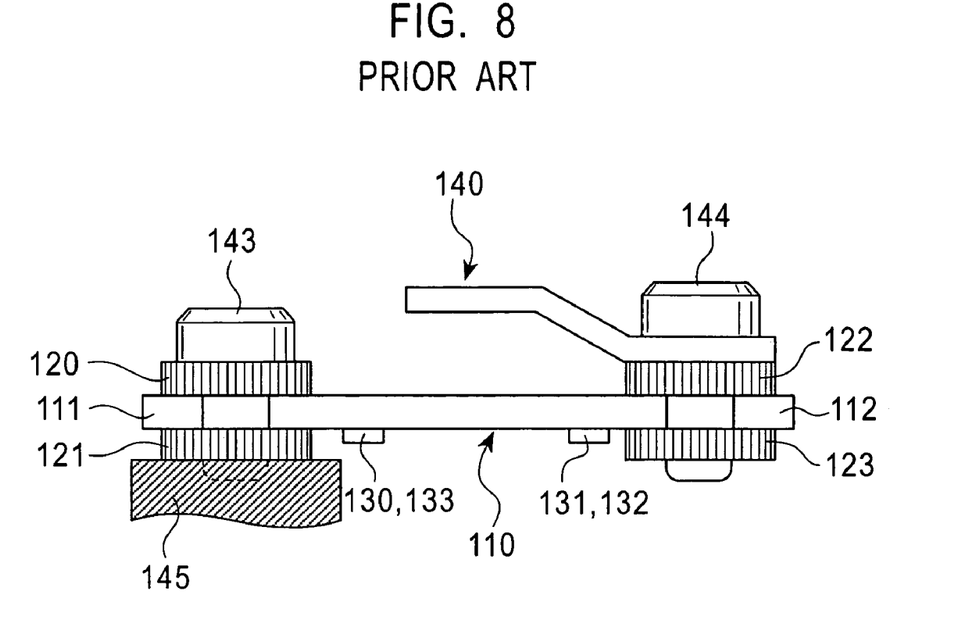
FIG. 8 is a side view of a conventional load sensor.
Figure 9:
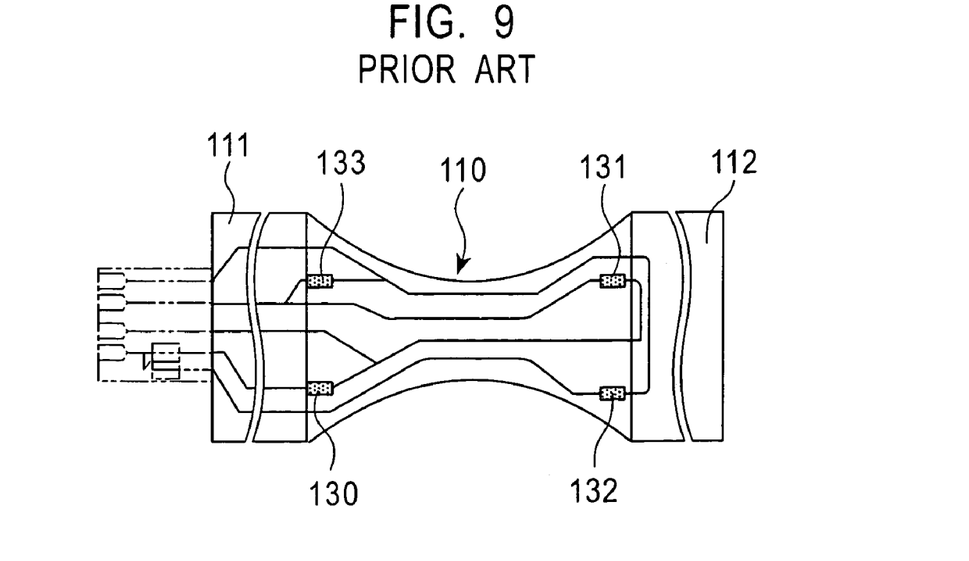
FIG. 9 is a partial plan view of the conventional load sensor.

Japanese Unexamined Patent Application Publication No. 2001-330522 discloses a conventional load sensor. FIGS. 8 and 9 illustrate the structure of such a load sensor. Specifically, FIG. 8 is a side view of the load sensor and FIG. 9 is a partial plan view of the load sensor. Such a load sensor includes a flat-plate resilient member 110 having a stationary segment 111 and a free segment 112; strain-sensor elements 130 to 133 disposed on the same surface of the resilient member 110; and a lever 140 extending towards the center of the resilient member 110. When a load is applied to the lever 140, the resilient member 110 bends and the strain-sensor elements 130 to 133 thus become strained. The load sensor converts the straining of the strain-sensor elements 130 to 133 to weight values.

Referring to FIGS. 8 and 9, the resilient member 110 is a metallic plate formed of, for example, stainless steel and is provided with the stationary segment 111 and the free segment 112. Moreover, the width of the central portion of the resilient member 110 is narrower than the other portions, and the resilient member 110 has resiliency. Two opposite surfaces of the stationary segment 111 are respectively provided with washers 120 and 121, and two opposite surfaces of the free segment 112 are respectively provided with washers 122 and 123. The washers 120 and 121 are fixed to the stationary segment 111 with a screw 143, and the washers 122 and 123 are fixed to the free segment 112 with a screw 144. The lever 140 is disposed on one of the surfaces of the washer 122 and is fixed to the free segment 112. Furthermore, the resilient member 110 is fixed to a base 145 such that the free segment 112 can be strained freely with respect to the stationary segment 111.

All of the strain-sensor elements 130 to 133 are disposed on the undersurface of the resilient member 110 such that a pair of strain-sensor elements 130 and 133 and a pair of strain sensor elements 131 and 132 have the narrow central portion of the resilient member 110 therebetween. When the strain-sensor elements 130 to 133 receive stress, such as a compressive force or tension, the density of a conductive material included in the strain-sensor elements 130 to 133 changes. Accordingly, the resistance of the strain-sensor elements 130 to 133 is variable. Also, the resistances of all the strain-sensor elements 130 to 133 are uniform with one another. The strain-sensor elements 130 to 133 are connected with an input electrode, a ground electrode, a first output electrode, and a second output electrode so as to define a bridge circuit.

An operation of such a conventional load sensor will now be described. When there is no stress applied to the lever 140, the resistance of the strain-sensor elements 130 to 133 is constant and the bridge circuit is in equilibrium. When a load is applied to the lever 140, a compressive force is applied to the stationary segment 111 such that a tension is generated in the free segment 112. This forces the resilient member 110 to bend. Consequently, the strain-sensor elements 130 to 133 become compressed and/or strained such that the resistance of each of the strain-sensor elements 130 to 133 changes with respect to the load applied to the lever 140. Thus, a voltage applied to the bridge circuit through the input electrode is divided by the strain-sensor elements 130 to 133 so as to create a difference in voltage between the first output electrode and the second output electrode. The load sensor then converts this difference in voltage to a weight value via a specific circuit and sends a signal corresponding to the value to a display device (not shown in the drawings).

According to the structure of such a conventional load sensor, when a drop impact test is performed based on the assumption that a load is applied to a vehicle seat during its installation, the maximum stress created by an impact is generated in the stationary segment instead of the narrow central portion of the resilient member. For this reason, since the resilient member is symmetrical with respect to the narrow central portion, an impact applied to the resilient member may lead to different permanent strain between the left side and the right side of the resilient member. This is problematic in that a proper detection output cannot be achieved.

SUMMARY OF THE INVENTION

Accordingly, it is an object of the present invention to provide a load sensor which reduces the maximum stress generated by drop impact, and which has substantially no difference in stress between strain-sensor elements at the left side of the load sensor and strain-sensor elements at the right side of the load sensor.

The present invention provides a load sensor which includes a resilient member including a stationary segment, a first load-receiving segment extending outward from the stationary segment, and a first arm segment between the first load-receiving segment and the stationary segment; and first and second strain-sensor elements disposed on the same surface of the first arm segment. The first strain-sensor element is adjacent to the first load-receiving segment, and the second strain-sensor element is adjacent to the stationary segment. The first arm segment is tapered such that the cross-sectional area of the arm segment decreases from the stationary segment to the first load-receiving segment, and the narrowest portion of the first arm segment has the first strain-sensor element disposed thereon. Accordingly, a difference between a stress applied to the first strain-sensor element and a stress applied to the second strain-sensor element is minimized when a load generated by an impact is applied to the first load-receiving segment.

According to the structure of the load sensor of the present invention, when a load is applied to the load-receiving segment, the stress generated is distributed towards the load-receiving segment and is thus prevented from being concentrated in the stationary segment. This reduces the level of maximum stress generated by drop impact and prevents permanent strain caused by the impact. Moreover, since the stress produced by drop impact is substantially uniform in positions corresponding to both strain-sensor elements, an equilibrium state of the resistance in the bridge circuit is maintained and the output offset-voltage is prevented from being shifted even if permanent strain is caused by drop impact.

Furthermore, the resilient member may comprise a flat plate having a predetermined thickness. Accordingly, the resilient member has resiliency and is constantly strained when a load is applied thereto.

Furthermore, the resilient member may further include a second load-receiving segment extending outward from the stationary segment, and a second arm segment between the stationary segment and the second load-receiving segment. The second arm segment may be provided with third and fourth strain-sensor elements, the third strain-sensor element being adjacent to the stationary segment, the fourth strain-sensor element being adjacent to the second load-receiving segment. In this case, the first to fourth strain-sensor elements are disposed on the same surface of the resilient member. Moreover, the second arm segment is tapered such that the cross-sectional area of the second arm segment decreases from the stationary segment to the second load-receiving segment, and the narrowest portion of the second arm segment has the fourth strain-sensor element disposed thereon. Consequently, a difference between a stress applied to the third strain-sensor element and a stress applied to the fourth strain-sensor element is minimized when a load generated by an impact is applied to the second load-receiving segment. Furthermore, the resilient member may further include a base at the center thereof such that the stationary segment is a part of the base. The stationary segment is disposed between the first and second arm segments, and an end of each arm segment is connected with the corresponding load-receiving segment.

Accordingly, load detection can be performed at two opposite sides with respect to the stationary segment, and moreover, this structure allows steady detection of load applied from all directions.

Furthermore, the first strain-sensor element and the second strain-sensor element on the first arm segment define a first pair, and the third strain-sensor element and the fourth strain-sensor element on the second arm segment define a second pair. Thus, the first pair and the second pair have the stationary segment therebetween.

Accordingly, the two pairs of the strain-sensor elements at opposite sides of the stationary segment allow balanced detection of load such that detection error is reduced.

DESCRIPTION OF THE PREFERRED EMBODIMENT

Figure 1:
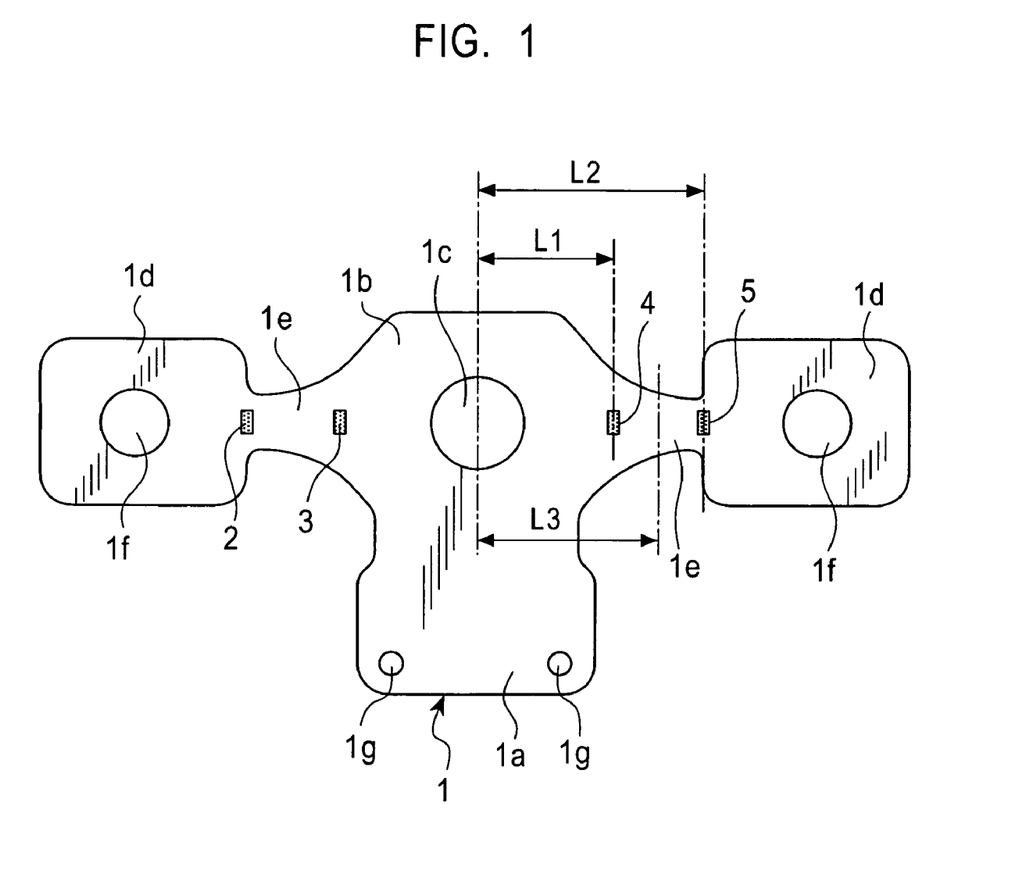
FIG. 1 is a plan view of a load sensor according to an embodiment of the present invention.
Figure 2:
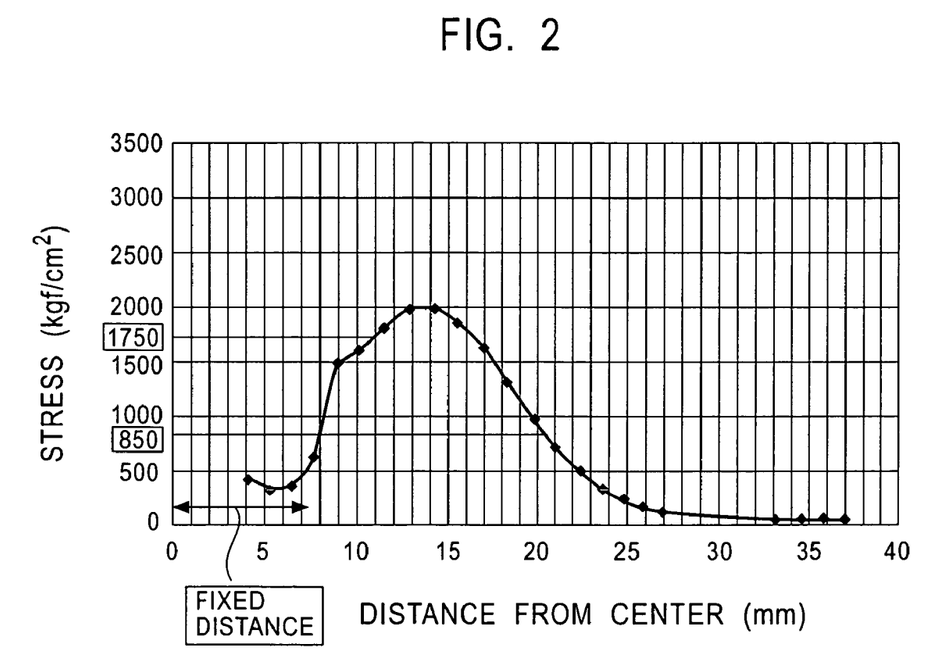
FIG. 2 is a stress-versus-distance graph from a stationary segment to one of load-receiving segments according to a comparative example in which the cross-sectional area of each arm segment of a resilient member is substantially uniform from the stationary segment to the corresponding load-receiving segment.
Figure 3:
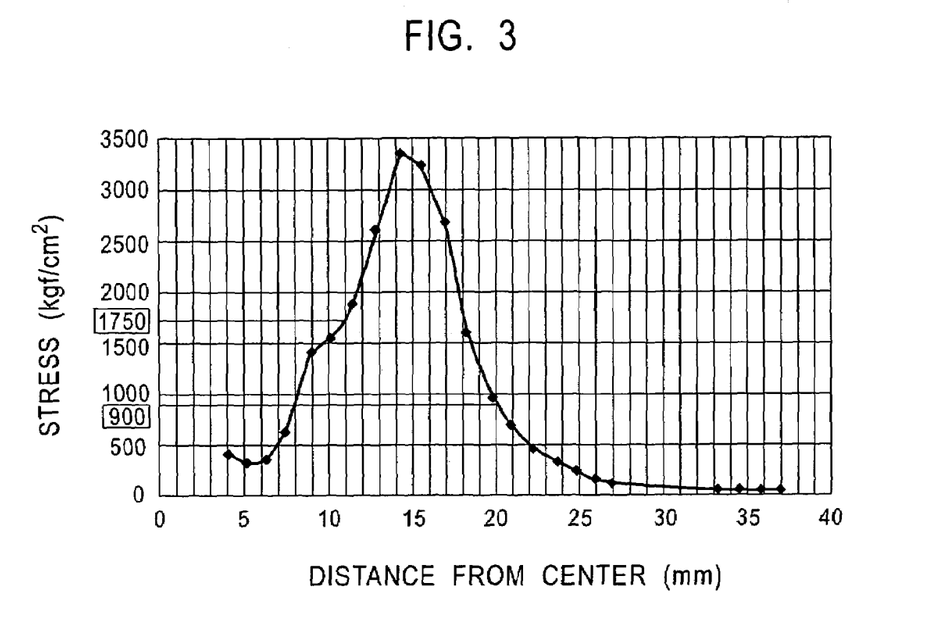
FIG. 3 is a stress-versus-distance graph from a stationary segment to one of load-receiving segments according to another comparative example in which each arm segment of a resilient member symmetrically narrows down from the stationary segment to the corresponding load-receiving segment such that the cross-sectional area of the arm segment decreases as it reaches the narrow portion and then increases from the narrow portion to the load-receiving segment.
Figure 4:
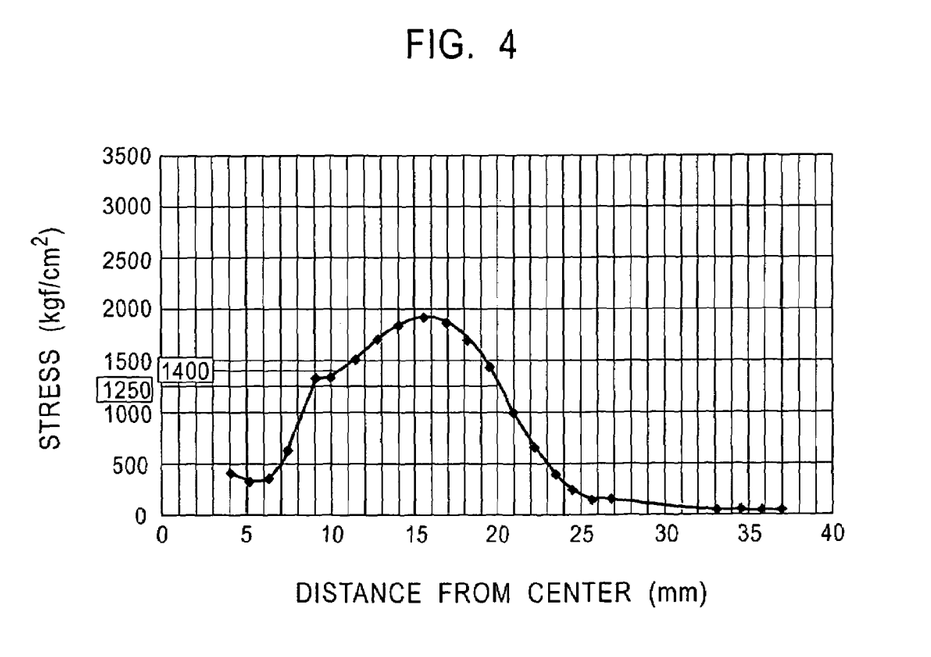
FIG. 4 is a stress-versus-distance graph from a stationary segment to one of load-receiving segments according to the embodiment of the present invention in which each arm segment of a resilient member is tapered such that the cross-sectional area of the arm segment decreases from the stationary segment to the corresponding load-receiving segment.
Figure 5:
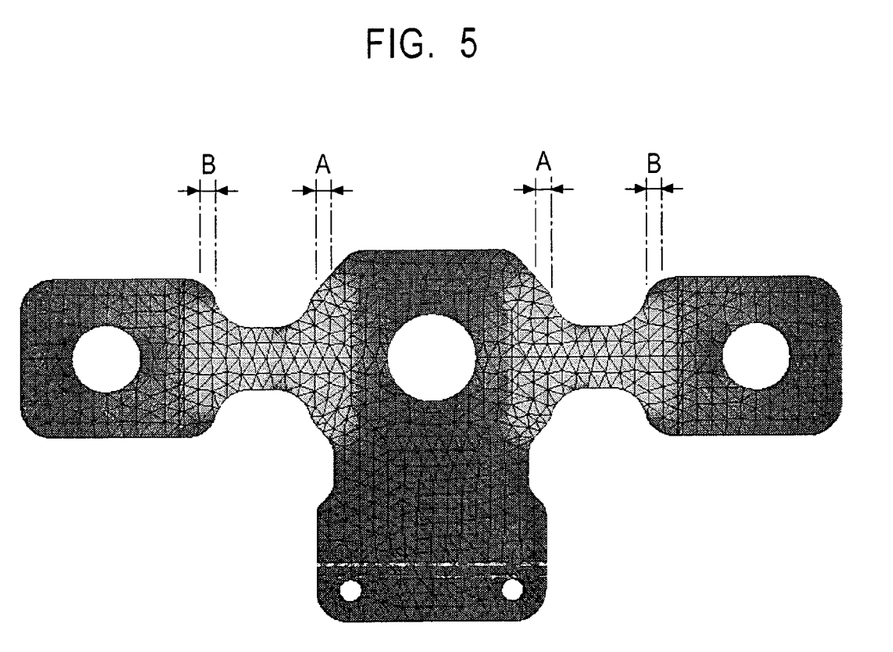
FIG. 5 corresponds to FIG. 2 and is a diagram illustrating the distribution of stress applied to the resilient member, the resilient member in FIG. 5 being given light-and-dark coloring to differentiate the amount of stress applied to the areas of the arm segments.
Figure 6:
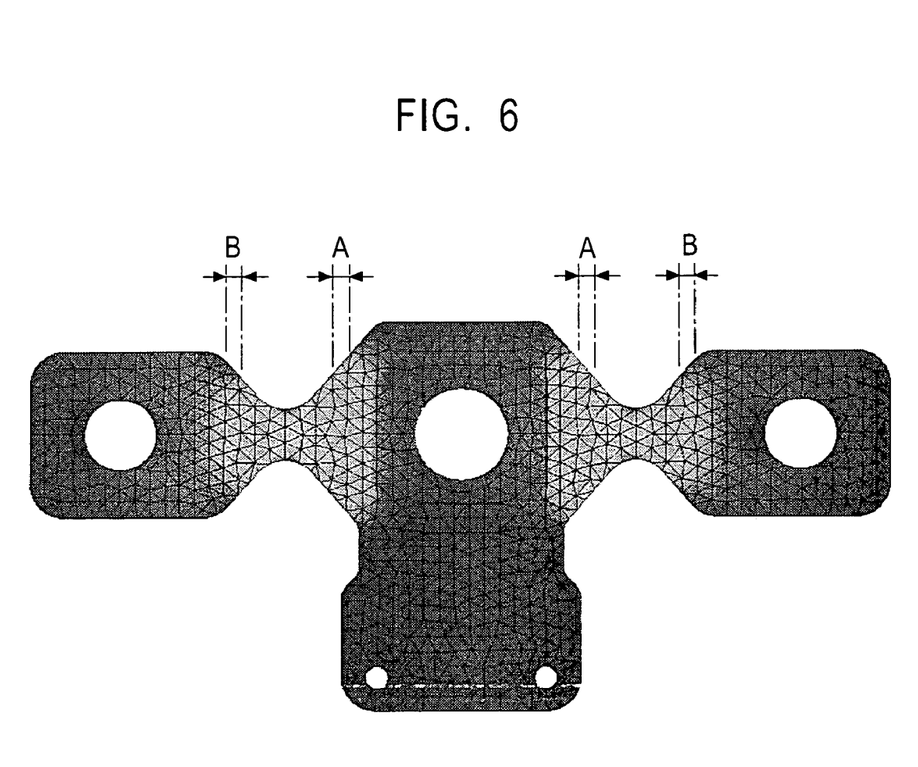
FIG. 6 corresponds to FIG. 3 and is a diagram illustrating the distribution of stress applied to the resilient member, the resilient member in FIG. 6 being given light-and-dark coloring to differentiate the amount of stress applied to the areas of the arm segments.
Figure 7:
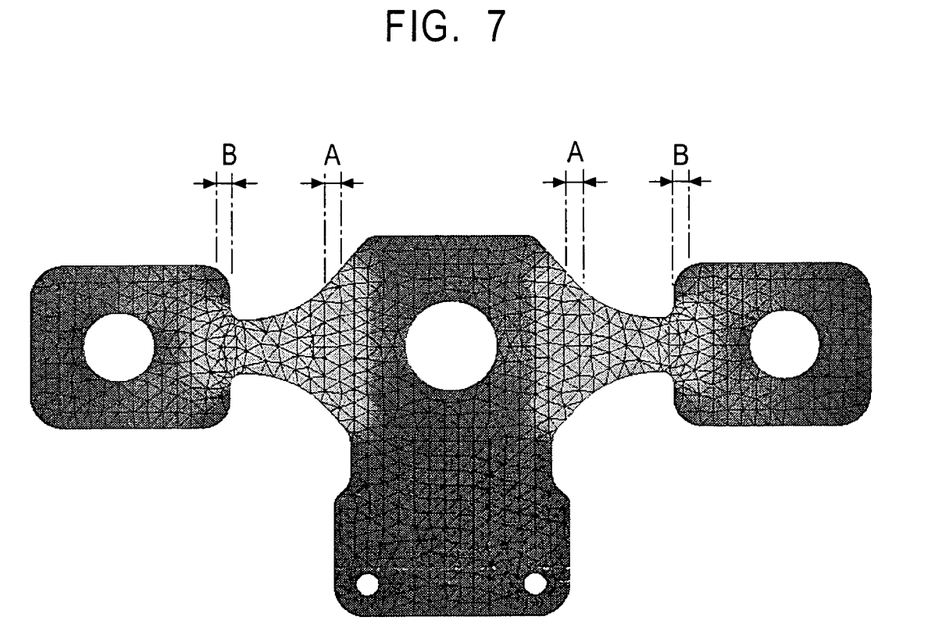
FIG. 7 corresponds to FIG. 4 and is a diagram illustrating the distribution of stress applied to the resilient member, the resilient member in FIG. 7 being given light-and-dark coloring to differentiate the amount of stress applied to the areas of the arm segments.

An embodiment of a load sensor according to the present invention will now be described with reference to FIGS. 1 to 7. FIG. 1 is a plan view of the load sensor according to the present invention. FIGS. 2 to 4 are diagrams each illustrating a stress distribution of a resilient member 1. Specifically, each of the diagrams is a stress-versus-distance graph from a stationary segment 1*b* to one of load-receiving segments 1*d*. In FIG. 2, the cross-sectional area of each of arm segments 1*e* is substantially uniform from the stationary segment 1*b* to the corresponding load-receiving segment 1*d*. In FIG. 3, each of the arm segments 1*e* symmetrically narrows down from the stationary segment 1*b* to the corresponding load-receiving segment 1*d* such that the cross-sectional area of the arm segment 1*e* decreases as it reaches the narrow portion and then increases from the narrow portion to the corresponding load-receiving segment 1*d*. In FIG. 4, each arm segment 1*e* is tapered such that the cross-sectional area of the arm segment 1*e* decreases from the stationary segment 1*b* to the corresponding load-receiving segment 1*d*. FIGS. 5 to 7 are diagrams illustrating stress distribution of the resilient member 1, in which the resilient member 1 is given light and dark coloring for differentiating the amount of stress applied to different areas of the resilient member 1. In detail, FIG. 5 corresponds to FIG. 2, FIG. 6 corresponds to FIG. 3, and FIG. 7 corresponds to FIG. 4. The structure of FIGS. 2 and 5 and the structure of FIGS. 3 and 6 are comparative examples for describing the advantages of the structure of FIGS. 4 and 7 corresponding to the embodiment of the present invention.

Referring to FIG. 1, the resilient member 1 is a metallic plate formed of, for example, stainless steel and is a substantially T-shaped flat plate having a predetermined thickness. The resilient member 1 includes a base 1*a* and a pair of load-receiving segments 1*d*. The base 1*a* includes a stationary segment 1*b* whose central portion is provided with an attachment hole 1*c*. The two load-receiving segments 1*d* extend outward from two opposite sides of the stationary segment 1*b* in a winglike manner. Moreover, a pair of arm segments 1*e* is each disposed between the stationary segment 1*b* and the corresponding load-receiving segment 1*d*. The arm segments 1*e* are tapered such that the cross-sectional area of each of the arm segments 1*e* becomes smaller as the arm segment 1*e* extends from the stationary segment 1*b* to the corresponding load-receiving segment 1*d*. Each of the load-receiving segments 1*d* is provided with a round hole 1*f*. Furthermore, a pair of screw holes 1*g* is respectively provided adjacent to two lower corners of the base 1*a* in FIG. 1.

In a case where the resilient member 1 is installed in a seat of, for example, a vehicle, a screw (not shown in the drawings) is inserted through the attachment hole 1*c* of the stationary segment 1*b* and is fixed to the vehicle body.

Moreover, the round holes 1f of the load-receiving segments 1d are engaged with levers (not shown in the drawings) which are in contact with the seat. When a load is applied to these levers, the arm segments 1e bend such that stress is applied to strain-sensor elements 2 to 5 disposed on the arm segments 1e. The strain-sensor elements 2 to 5 will be described later in detail. Consequently, load detection is performed based on the stress applied to the strain-sensor elements 2 to 5.

Accordingly, since the resilient member 1 is a flat plate having a predetermined thickness and has resiliency, the resilient member 1 is constantly strained when a load is applied thereto. As previously described, in the resilient member 1, the stationary segment 1b is provided in the base 1a, the arm segments 1e are each provided between the stationary segment 1b and the corresponding load-receiving segment 1d, and each of the load-receiving segments 1d extends from the end of the corresponding arm segment 1e. According to this structure, load detection can be performed at two opposite sides with respect to the stationary segment 1b, and moreover, this structure allows steady detection of load applied from all directions.

Furthermore, on one of the surfaces of the resilient member 1, the two arm segments 1e are respectively provided with the strain-sensor elements 2 and 5 disposed adjacent to the two corresponding load-receiving segments 1d, and are also respectively provided with the strain-sensor elements 3 and 4 disposed adjacent to the two opposite sides of the stationary segment 1b. Specifically, a pair of strain-sensor elements 2 and 3 and a pair of strain-sensor elements 4 and 5 have the stationary segment 1b of the resilient member 1 therebetween.

The strain-sensor elements 3 and 4 adjacent to the stationary segment 1b are positioned at the base of the corresponding arm segments 1e where the arm segments 1e are widest, whereas the strain-sensor elements 2 and 5 adjacent to the corresponding load-receiving segments 1d are positioned at the tapered portions of the respective arm segments 1e where the arm segments 1e are narrowest.

Accordingly, the two pairs of the strain-sensor elements 2 to 5 at opposite sides of the stationary segment 1b allow balanced detection of load such that detection error is reduced.

The strain-sensor elements 2 to 5 are binders formed of, for example, low-melting glass, in which a conductive material such as metal or metal oxide is distributed. The density of the distributed conductive material changes when the strain-sensor elements 2 to 5 receive stress, such as a compressive force or tension, such that the resistance is variable. Also, the resistances of all the strain-sensor elements 2 to 5 are uniform with one another.

The strain-sensor elements 2 to 5 are connected with a wiring pattern, which is not shown in the drawings, so as to define a bridge circuit. The bridge circuit includes the strain-sensor elements 2 to 5 and a wiring connector (not shown in the drawings) having an input electrode, a ground electrode, a first output electrode, and a second output electrode. The wiring connector is engaged with the screw holes 1g of the base 1a. When stress is not applied to the strain-sensor elements 2 to 5, the resistance is constant such that the bridge circuit is in equilibrium.

When a load is applied to the load-receiving segments 1d in this state of equilibrium, the arm segments 1e of the resilient member 1 are bent such that the strain-sensor elements 2 to 5 on the arm segments 1e become compressed or strained. In proportion to the load applied, the resistance of the strain-sensor elements 2 to 5 changes. Thus, a voltage applied to the bridge circuit through the input electrode is divided by the strain-sensor elements 2 to 5 so as to create a difference in voltage between the first output electrode and the second output electrode. The load sensor then converts this difference in voltage to a weight value via a specific circuit and sends a signal corresponding to the value to a display device (not shown in the drawings).

The stress distribution of the resilient member 1 will now be described with reference to FIGS. 2 to 7. In the examples below, a load of 3 kgf is applied to both load-receiving segments 1d at positions 13.5 mm from the center of the stationary segment 1b.

Referring to FIGS. 2 and 5, the cross-sectional area of each arm segment 1e of the resilient member 1 is substantially uniform from the stationary segment 1b to the corresponding load-receiving segment 1d such that the two opposite edges of the arm segment 1e are substantially linear. The strain-sensor elements 3 and 4 are each positioned 11 mm from the center of the stationary segment 1b (indicated by L1 in FIG. 1), and the strain-sensor elements 2 and 5 are each positioned 20 mm from the center of the stationary segment 1b (indicated by L2 in FIG. 1). A stress applied to the positions of the resilient member 1 corresponding to the strain-sensor elements 3 and 4 is 1750 kgf/cm$^2$, and a stress applied to the positions of the resilient member 1 corresponding to the strain-sensor elements 2 and 5 is 850 kgf/cm$^2$. FIG. 2 is a stress-versus-distance graph from the center of the stationary segment 1b to one of the load-receiving segments 1d.

According to this structure in FIGS. 2 and 5, the strain-sensor elements 3 and 4 adjacent to the stationary segment 1b receive greater stress than the strain-sensor elements 2 and 5 adjacent to the load-receiving segments 1d. FIG. 5 is a diagram illustrating the distribution of stress applied to the resilient member 1.

The resilient member 1 is given light-and-dark coloring to differentiate the amount of stress applied to the areas of the arm segments 1e. In detail, the darker areas indicate a larger amount of stress applied, whereas the lighter areas indicate a smaller amount of stress applied. Undistorted areas of the base 1a, the stationary segment 1b, and the load-receiving segments 1d are given the darkest coloring. In this example, as it is apparent from FIG. 5, sections A, where the strain-sensor elements 3 and 4 are disposed, are darker than sections B where the strain-sensor elements 2 and 5 are disposed.

Referring to FIGS. 2 and 5, according to this structure, the maximum stress generated by drop impact is present at a side of each arm segment 1e adjacent to the stationary segment 1b rather than the central portion between the stationary segment 1b and the corresponding load-receiving segment 1d. This means that there is a difference in stress between the strain-sensor elements 3 and 4 and the strain-sensor elements 2 and 5, thus causing different permanent strain between the strain-sensor elements 3 and 4 and the strain-sensor elements 2 and 5. Moreover, due to the difference in resistance between the strain-sensor elements 3 and 4 and the strain-sensor elements 2 and 5 caused by the strain, the output offset-voltage is shifted.

Referring to FIGS. 3 and 6, each arm segment 1e of the resilient member 1 symmetrically narrows down from the stationary segment 1b to the corresponding load-receiving segment 1d such that the cross-sectional area of the arm segment 1e decreases as it reaches the narrow portion and then increases from the narrow portion to the corresponding load-receiving segment 1d. Similar to the example in FIGS. 2 and 5, the strain-sensor elements 3 and 4 are each positioned 11 mm from the center of the stationary segment 1b (indicated by L1 in FIG. 1), and the strain-sensor elements 2 and 5 are each positioned 20 mm from the center of the stationary segment 1b (indicated by L2 in FIG. 1). A stress applied to the positions of the resilient member 1 corresponding to the strain-sensor elements 3 and 4 is 1750 kgf/cm$^2$, and a stress applied to the positions of the resilient member 1 corresponding to the strain-sensor elements 2 and 5 is 900 kgf/cm$^2$. FIG. 3 is a stress-versus-distance graph from the center of the stationary segment 1b to one of the load-receiving segments 1d.

Moreover, similar to the example in FIGS. 2 and 5, according to this structure in FIGS. 3 and 6, the strain-sensor elements 3 and 4 adjacent to the stationary segment 1b receive greater stress than the strain-sensor elements 2 and 5 adjacent to the load-receiving segments 1d. FIG. 6 is a diagram illustrating the distribution of stress applied to the resilient member 1.

Similarly, the resilient member 1 is given light-and-dark coloring to differentiate the amount of stress applied to the areas of the arm segments 1e. In detail, the darker areas indicate a larger amount of stress applied, whereas the lighter areas indicate a smaller amount of stress applied. Undistorted areas of the base 1a, the stationary segment 1b, and the load-receiving segments 1d are given the darkest coloring. As it is apparent from FIG. 6, sections A, where the strain-sensor elements 3 and 4 are disposed, are darker than sections B where the strain-sensor elements 2 and 5 are disposed.

Referring to FIGS. 3 and 6, according to this structure, the maximum stress generated by drop impact is present at a side of each arm segment 1e adjacent to the stationary segment 1b rather than the central portion between the stationary segment 1b and the corresponding load-receiving segment 1d. This means that there is a difference in stress between the strain-sensor elements 3 and 4 and the strain-sensor elements 2 and 5, thus causing different permanent strain between the strain-sensor elements 3 and 4 and the strain-sensor elements 2 and 5. Moreover, due to the difference in resistance between the strain-sensor elements 3 and 4 and the strain-sensor elements 2 and 5 caused by the strain, the output offset-voltage is shifted. Furthermore, since the central portion (about 15 mm from the stationary segment 1b) of each arm segment 1e is narrow, the central portion receives the maximum amount of stress (3300 kgf/cm$^2$).

Referring to FIGS. 4 and 7, the structure of the load sensor according to the embodiment of the present invention will now be described. Here, each of the arm segments 1e is tapered such that the cross-sectional area of the arm segment 1e decreases from the stationary segment 1b to the corresponding load-receiving segment 1d. Similar to the above examples, the strain-sensor elements 3 and 4 are each positioned 11 mm from the center of the stationary segment 1b (indicated by L1 in FIG. 1), and the strain-sensor elements 2 and 5 are each positioned 20 mm from the center of the stationary segment 1b (indicated by L2 in FIG. 1). A stress applied to the positions of the resilient member 1 corresponding to the strain-sensor elements 3 and 4 is 1400 kgf/cm$^2$, and a stress applied to the positions of the resilient member 1 corresponding to the strain-sensor elements 2 and 5 is 1250 kgf/cm$^2$. FIG. 4 is a stress-versus-distance graph from the center of the stationary segment 1b to one of the load-receiving segments 1d.

According to this structure in FIGS. 4 and 7, the strain-sensor elements 3 and 4 adjacent to the stationary segment 1b and the strain-sensor elements 2 and 5 adjacent to the load-receiving segments 1d receive substantially the same amount of stress. FIG. 7 is a diagram illustrating the distribution of stress applied to the resilient member 1.

Similar to the above examples, the resilient member 1 is given light-and-dark coloring to differentiate the amount of stress applied to the areas of the arm segments 1e. In detail, the darker areas indicate a larger amount of stress applied, whereas the lighter areas indicate a smaller amount of stress applied. Undistorted areas of the base 1a, the stationary segment 1b, and the load-receiving segments 1d are given the darkest coloring. As it is apparent from FIG. 7, sections A, where the strain-sensor elements 3 and 4 are disposed, and sections B, where the strain-sensor elements 2 and 5 are disposed, substantially have the same darkness.

Referring to FIGS. 4 and 7, according to this structure, the stress generated by drop impact is substantially the same at the two opposite sides of each arm segment 1e. This means that there is substantially no difference in stress between the strain-sensor elements 3 and 4 adjacent to the stationary segment 1b and the strain-sensor elements 2 and 5 adjacent to the load-receiving segments 1d, thus preventing difference in strain when a load is applied to the load sensor due to drop impact. Moreover, since there is substantially no difference in resistance due to strain, the equilibrium state of the resistance in the bridge circuit is maintained and the output offset-voltage is prevented from being shifted even if permanent strain is caused by drop impact. Furthermore, since the central portion of each arm segment 1e positioned 15 mm from the center of the stationary segment 1b (indicated by L3 in FIG. 1) is not narrowed down and a larger cross-sectional area can thus be obtained, the maximum stress at the central portion can be kept low at 1900 kgf/cm$^2$.

Accordingly, the load sensor according to the embodiment of the present invention corresponds to the structure of FIGS. 4 and 7, and is provided with the resilient member having the stationary segment 1b, the load-receiving segments 1d extending outward from the stationary segment 1b, and the arm segments 1e each disposed between the stationary segment 1b and the corresponding load-receiving segment 1d. Moreover, the load sensor is further provided with the strain-sensor elements 3 and 4 adjacent to the stationary segment 1b, and the strain-sensor elements 2 and 5 adjacent to the corresponding load-receiving segments 1d. The strain-sensor elements 2 to 5 are all disposed on the same surface of the resilient member 1. Each arm segment 1e of the resilient member 1 is tapered such that the cross-sectional area of the arm segment 1e decreases from the stationary segment 1b to the corresponding load-receiving segment 1d. The narrowest portions of the arm segments 1e have the strain-sensor elements 2 and 5 disposed thereon. According to the load sensor of the present invention, when a load is applied to the load-receiving segments 1d, the stress generated is distributed evenly and is prevented from being concentrated in certain areas of the resilient member 1. This reduces the level of maximum stress generated by drop impact and prevents permanent strain due to the impact. Moreover, since the stress produced by drop impact is substantially uniform in positions corresponding to the strain-sensor elements 2 to 5, an equilibrium state of the resistance in the bridge circuit is maintained and the output offset-voltage is prevented from being shifted even if permanent strain is caused by drop impact.

What is claimed is:
1. A load sensor comprising:
a resilient member including a stationary segment, a first load-receiving segment extending outward from the stationary segment, and a first arm segment between the first load-receiving segment and the stationary segment; and first and second strain-sensor elements disposed on the same surface of the first arm segment, the first strain-sensor element being adjacent to the first load-receiving segment, the second strain-sensor element being adjacent to the stationary segment, wherein the first arm segment is tapered such that the cross-sectional area of the arm segment decreases from the stationary segment to the first load-receiving segment, the narrowest portion of the first arm segment having the first strain-sensor element disposed thereon, whereby a difference between a stress applied to the first strain-sensor element and a stress applied to the second strain-sensor element is minimized when a load generated by an impact is applied to the first load-receiving segment.

2. The load sensor according to claim 1, wherein the resilient member comprises a flat plate having a predetermined thickness.

3. The load sensor according to claim 1, wherein the resilient member further includes a second load-receiving segment extending outward from the stationary segment, and a second arm segment between the stationary segment and the second load-receiving segment, wherein the second arm segment is provided with third and fourth strain-sensor elements, the third strain-sensor element being adjacent to the stationary segment, the fourth strain-sensor element being adjacent to the second load-receiving segment, the first to fourth strain-sensor elements being disposed on the same surface of the resilient member, wherein the second arm segment is tapered such that the cross-sectional area of the second arm segment decreases from the stationary segment to the second load-receiving segment, the narrowest portion of the second arm segment having the fourth strain-sensor element disposed thereon, whereby a difference between a stress applied to the third strain-sensor element and a stress applied to the fourth strain-sensor element is minimized when a load generated by an impact is applied to the second load-receiving segment, wherein the resilient member further includes a base at the center thereof, the stationary segment being a part of the base, wherein the stationary segment is disposed between the first and second arm segments, and wherein an end of each arm segment is connected with the corresponding load-receiving segment.

4. The load sensor according to claim 3, wherein the first strain-sensor element and the second strain-sensor element on the first arm segment define a first pair, and the third strain-sensor element and the fourth strain-sensor element on the second arm segment define a second pair, the first pair and the second pair having the stationary segment therebetween.

* * * * *